July 10, 1962 P. J. W. JOCHEMS 3,043,726
METHOD OF PRODUCING SEMI-CONDUCTOR ELECTRODE SYSTEMS
Filed Jan. 9, 1959
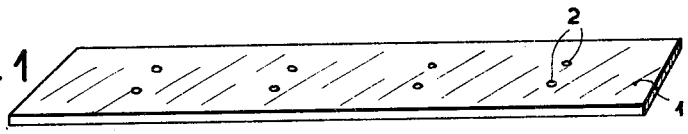
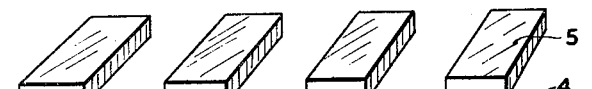
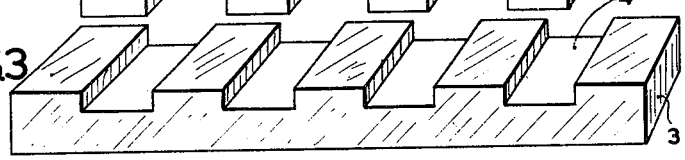
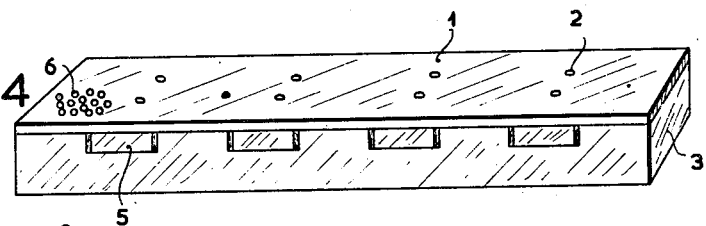
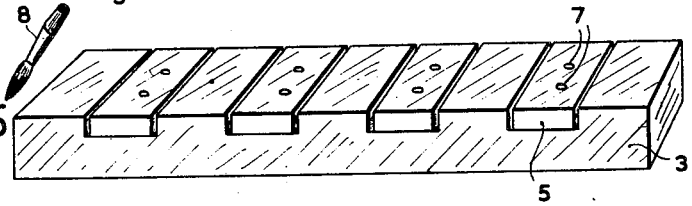
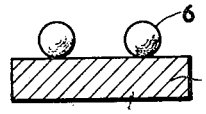
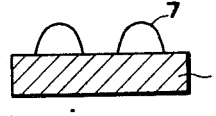
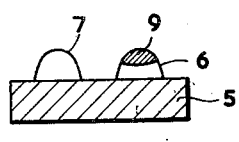
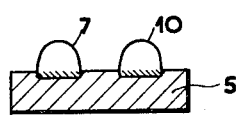
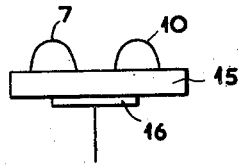
INVENTOR
PIETER JOHANNES WILHELMUS JOCHEMS
BY
AGENT 3,043,726
METHOD OF PRODUCING SEMI-CONDUCTOR ELECTRODE SYSTEMS
Pieter Johannes Wilhelmus Jochems, Eindhoven, Netherlands, assignor to North American Philips Company, Inc., New York, N.Y., a corporation of Delaware
Filed Jan. 9, 1959, Ser. No. 785,829
Claims priority, application Netherlands Jan. 14, 1958
12 Claims. (Cl. 148—1.5)

This invention relates to a method of producing semi-conductor electrode systems or devices, such as transistors or crystal diodes, in which at least two electrodes are provided on a semi-conductor body by alloying, at least one electrode containing an active impurity. The term "active impurity" is to be understood to mean elements and compounds which are capable of affecting the electrical properties of the electrodes, for example acceptors and donors.

Usually these electrode systems have electrodes which show different electrical properties; for example, a distinction is made between rectifying and non-rectifying or ohmic electrodes; for this purpose usually the composition of the electrode material is suitably chosen, at least two bodies of different compositions being applied and alloyed to the semi-conductor body.

When the electrodes are provided in close proximity to each other to one surface of the semi-conductor body, there is a risk, particularly if one of these electrodes contains an active impurity which rapidly diffuses or tends to spread over the surface of the body, that this electrode contaminates at least one other electrode.

Another difficulty which arises when electrode bodies of different kinds are used consists in that these bodies, which are of the same size and frequently are shaped in the form of pellets having a diameter of less than 1 mm., are readily mistaken for one another. This risk exists especially when the electrode bodies are applied by alloying by means of a jig containing a number of adjacent receiving holes for the electrode bodies to be alloyed.

The present invention is based on the recognition of the fact that the properties of such electrodes can be influenced after they have been provided on a semi-conductor body. Thus, an active impurity which tends to contaminate other electrodes need not be subjected to all the heat treatments used in manufacture.

According to the invention, at least two equal electrodes are provided on a semi-conductor body after which to at least one of the electrodes an active impurity is added, the assembly being subjected to a heat treatment so that the properties of the electrode or electrodes to which an impurity was added will differ from those of the electrode or electrodes to which no impurity was added.

The mutually equal electrodes can be obtained by alloying electrode bodies at a comparatively low temperature, while the heat treatment subsequent to the addition of an impurity can be effected at a higher temperature.

However, the procedure can be reversed, the equal electrodes being provided by alloying at a temperature higher than the temperature of the heat treatment subsequent to the addition of the impurity.

This latter method is particularly preferable if the impurity to be added has the above-mentioned tendency to spread beyond the electrode to which it was applied. This is the case, for example, with active impurities having a high vapour pressure, such as arsenic and antimony, or with impurities which readily spread over a semi-conductor surface, such as gallium. Obviously this risk of mutual contamination also depends upon the relative spacings of the electrodes.

When the semi-conductor body consists of germanium, the active impurity to be applied to at least one of the electrodes preferably consists of aluminum.

Further details of the invention will be given with reference to the description of a few embodiments which are illustrated in the accompanying drawing in which:

FIGURES 1, 2 and 3 are diagrammatic perspective views of the two principal parts of a jig shown separately and of four semi-conductor bodies.

FIG. 4 shows the assembled jig.

FIG. 5 shows the application of an active impurity.

FIGS. 6 to 9 are diagrammatic sectional views of a semi-conductor electrode system in the various stages of manufacture.

FIG. 10 is a sectional view of a transistor produced by carrying out the method in accordance with the invention.

The electrode or electrode-forming bodies can be applied by alloying with the aid of a jig the two principal parts of which are shown in FIGS. 1 and 3. This jig has a cover plate 1 the thickness of which is about equal to the diameter of the electrode bodies to be provided by alloying. This cover plate may consist of mica having a thickness of 100 microns. Eight holes 2 are drilled in the cover plate so as to be arranged in four pairs with relative spacings of about 100 microns. Furthermore the jig comprises a supporting block 3 (FIG. 3) which can be made of graphite and in which four recesses 4 for receiving semi-conductor bodies 5, FIG. 2) are formed by grinding.

The same jig is shown in FIG. 4 in the closed position. The cover plate 1 and the supporting block 3 are pressed together by clamps (not shown).

A number of electrode bodies 6 are sprinkled on the cover plate 1, which bodies are preferably shaped in the form of pellets and are proportioned so that each aperture 2 is completely filled by one pellet 6. The number of sprinkled pellets is sufficient to fill all apertures 2. After any remaining pellets have been removed, the assembly is subjected to a heat treatment at a temperature sufficient to cause the electrode bodies to adhere to the semi-conductor bodies 5 so that electrodes 7 are formed. Further details about compositions and temperatures will be given hereinafter.

Subsequently the cover plate 1 can be removed, as is shown in FIG. 5. Now one electrode of each pair of electrodes 7 is provided with an active impurity which may be applied as a fine powder dispersed in a binder with the aid of a brush 8. Then the supporting block 5 together with its contents is again put in a furnace so that the active impurity is completely absorbed by the electrodes to which it was applied whereas the other electrodes can maintain their original natures. When the temperature at which this second heat treatment is effected is higher than that at which the first heat treatment was performed the electrode material will now act upon the semi-conductor bodies to a greater depth. However, as has been mentioned hereinbefore, the second treatment may alternatively be carried out at a lower temperature.

The various stages through which the electrode system passes in this method of manufacture are shown in FIGS. 6 to 9 to a large scale. In the first stage the electrode bodies 6 are loosely scattered over the semi-conductor body 5 (FIG. 6); after the first heat treatment they are fused to the surface of this body 5 and form the electrodes 7 (FIG. 7); subsequently one of the two electrodes is provided with an amount of an active impurity 9 (FIG. 8) and finally, after the second heat treatment, both electrodes have further penetrated into the semi-conductor body 5, while the active impurity 9 is fused with the electrode material and has formed an electrode 10 the properties of which are different from those of the electrodes 7 (FIG. 9).

Obviously, the method in accordance with the invention is not restricted to the use of electrode bodies and semi-conductor bodies of the form described hereinbefore or to the alloying of a definite number of electrode bodies or to the use of certain jigs.

Thus, a transistor may be produced by alloying two electrodes to one surface of a thin semi-conductor body 15 (FIG. 10) in the manner described hereinbefore. One of these electrodes is made rectifying by the addition of an active impurity and serves as the emitter, and the other electrode constitutes the base. To the other side of the body 15 a rectifying electrode 16 is also applied.

Now two examples will be given of compositions of electrode bodies and impurities to be added thereto. The first example describes n-forming contacts on germanium, at least one of which is changed into a p-forming contact. The second example describes p-forming contacts on germanium, at least one of which is changed into an n-forming contact.

I. On a semi-conductor body made of germanium, electrode bodies consisting of bismuth are provided and alloyed to it in hydrogen at 600° C. To one of these electrodes there is applied a dispersion of 40 gms. of powdered aluminum in a binder consisting of a solution of 20 gms. methacrylate in 100 mgs. of xylene. The amount of aluminum, which here is the active impurity, is not critical; a small amount generally is sufficient. The amount applied is so small that the dispersion does not spread beyond the electrode to which it is applied. A second heat treatment is now performed at 750° C., likewise in hydrogen, so that the dispersion agent disappears and the aluminum fuses with the electrode which consequently obtains a p-forming nature. This occurs because the aluminum has a higher segregation coefficient in the germanium than does the bismuth, and thus it overcompensates the bismuth converting the alloyed electrode to p-type conductivity. Hence, these latter electrodes are rectifying on n-type germanium and ohmic on p-type germanium. Before the aluminum was added, the bismuth electrodes formed ohmic contacts on n-type germanium and slightly rectifying contacts on p-type germanium.

II. This relationship is reversed when a number of electrode bodies consisting of indium are alloyed to germanium bodies. Heating is again carried out in hydrogen, at 500° C. To at least one of the electrodes a dispersion of powdered antimony in the same binder is added after which the assembly is heated again in hydrogen, at 450° C. The electrodes produced form n-type contacts while the original indium electrodes were of the p-type. Thus the risk of undesirable contamination of the electrode or electrodes which do not contain antimony is highly reduced.

What is claimed is:

1. A method for producing a semi-conductor device, comprising providing on the same surface of a semiconductive body and adjacent one another plural fused contacts of the same composition, adding to at least one but to less than all of the fused contacts an active impurity capable of altering the conductivity of the contact when incorporated therein, and thereafter subjecting the assembly to a heat treatment whereby the active impurity becomes incorporated in the contact to which it was added thereby to selectively alter its conductivity and make it different from those contacts to which the said impurity was not added.

2. A method of providing tiny adjacent regions of different conductivity in a semiconductive body, comprising fusing and alloying a pair of closely adjacent, substantially equally-sized masses of the same composition to the same surface of the semiconductive body to produce underneath the masses adjacent regions of the same conductivity in the body, thereafter adding to one selected mass only of the pair an active impurity capable of altering the conductivity of the underlying body region when incorporated therein, and thereafter refusing the pair of masses to incorporate the added impurity into the selected mass and thereby alter the conductivity of the underlying region and make it different from that of the adjacent region.

3. A method as set forth in claim 2 wherein the body is of germanium, and the active impurity is aluminum.

4. A method of providing tiny adjacent regions of opposite conductivity forming rectifying and ohmic connections, respectively, in a semiconductive body, comprising fusing and alloying a pair of closely adjacent, equally-sized masses less than one millimeter in diameter and of the same composition to the same surface of the semiconductive body to produce underneath the masses adjacent regions of the same conductivity in the body, thereafter adding to one selected mass only of the pair an active impurity capable of reversing the conductivity of the underlying body region when incorporated therein, and thereafter refusing the pair of masses to incorporate the added impurity into the selected mass and thereby reverse the conductivity of the underlying region and make it opposite from that of the adjacent region.

5. A method as set forth in claim 4 wherein the temperature at which the first fusion is carried out is lower than the temperature at which the refusion is carried out.

6. A method as set forth in claim 4 wherein the temperature at which the first fusion is carried out is higher than the temperature at which the refusion is carried out.

7. A method as set forth in claim 4, wherein the impurity is added by painting the selected mass with a liquid dispersion of the impurity.

8. A method of providing tiny adjacent regions of opposite conductivity in a semiconductive body forming rectifying and ohmic connections thereto, comprising fusing and alloying a pair of closely adjacent, equally-sized masses of the same composition to the same surface of the semiconductive body to produce underneath the masses adjacent regions of the same conductivity in the body forming ohmic connections to the body, thereafter coating one selected mass only of the pair with an active impurity capable of reversing the conductivity of the underlying body region when incorporated therein to form a rectifying connection to the body, and thereafter refusing the pair of masses to incorporate the added impurity into the selected mass and thereby reverse the conductivity of the underlying region and make it opposite from that of the adjacent region.

9. A method as set forth in claim 8 wherein the active impurity has a higher segregation coefficient than any substance in the masses.

10. A method of providing plural pairs of tiny adjacent regions of different conductivity in different semiconductive body portions, comprising fusing a pair of closely adjacent, equally-sized pellets of diameters less than one millimeter and of the same composition to the same surface of each of the semiconductive body portions to produce underneath the pellets adjacent regions of the same conductivity in each body portion with all of the pairs of pellets being arrayed along a line, thereafter painting one selected pellet only of each pair, which selected pellets are also arrayed in a line, with an active impurity capable of altering the conductivity of the underlying body region when incorporated therein, and thereafter refusing all of the pellets to incorporate the added impurity into each selected pellet and thereby alter the conductivity of the underlying region and make it different from that of the adjacent region.

11. A method of providing plural pairs of tiny adjacent regions of opposite conductivity in different semiconductive body portions, comprising placing the semiconductive body portions in a jig provided with plural, small, adjacent pairs of apertures for receiving electrode-forming pellets, filling all of the apertures with pellets of the same size and same composition so that each pair of pellets contacts the same surface of the semi-conductive body portions, thereafter fusing and alloying all of the pellet pairs to each of the semiconductive body portions to produce underneath the pellets adjacent separated regions of the same conductivity in each body portion, thereafter coating one selected fused pellet only of each pair with an active impurity capable of reversing the conductivity of the underlying body region when incorporated therein, and thereafter refusing all of the fused pellets to incorporate the added impurity into each selected pellet and thereby reverse the conductivity of the underlying region and make it opposite from that of the adjacent region.

12. A method as set forth in claim 11 wherein the first fusion temperature is different from the second fusion temperature, and the pellets have diameters of less than one millimeter.

References Cited in the file of this patent

UNITED STATES PATENTS

| | | |
|---|---|---|
| 2,701,326 | Pfann | Feb. 1, 1955 |
| 2,836,521 | Longini | May 27, 1958 |
| 2,862,840 | Kordalewski | Dec. 2, 1958 |
| 2,874,083 | Stripp et al. | Feb. 17, 1959 |
| 2,879,188 | Strull | Mar. 24, 1959 |